(12) United States Patent
Lai et al.

(10) Patent No.: US 12,482,064 B2
(45) Date of Patent: Nov. 25, 2025

(54) IMAGE CORRECTION SYSTEM AND METHOD

(71) Applicant: AVER INFORMATION INC., New Taipei (TW)

(72) Inventors: Yan-Zhen Lai, New Taipei (TW); Kuo-Hao Huang, New Taipei (TW); Shang-Hua Wu, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 379 days.

(21) Appl. No.: 18/108,223

(22) Filed: Feb. 10, 2023

(65) Prior Publication Data
US 2023/0260086 A1 Aug. 17, 2023

(30) Foreign Application Priority Data
Feb. 11, 2022 (TW) .................................. 111105064

(51) Int. Cl.
*G06T 3/608* (2024.01)
*G06T 7/13* (2017.01)
(Continued)

(52) U.S. Cl.
CPC ................ *G06T 3/608* (2013.01); *G06T 7/13* (2017.01); *G06T 7/70* (2017.01); *G06V 10/761* (2022.01); *G06V 2201/07* (2022.01)

(58) Field of Classification Search
CPC .. G06T 3/608; G06T 7/13; G06T 7/70; G06T 5/80; G06T 3/00; G06V 10/761; G06V 2201/07
See application file for complete search history.

(56) References Cited

U.S. PATENT DOCUMENTS 7,760,962 B2 * 7/2010 Sambongi ................. G06T 5/50
382/153
8,358,871 B2 * 1/2013 Tu .......................... G06V 10/243
382/172
(Continued)

FOREIGN PATENT DOCUMENTS

JP 2002057879 A * 2/2002
JP 2002133407 A * 5/2002

OTHER PUBLICATIONS

Ahmad, Riaz, Saeeda Naz, and Imran Razzak. "Efficient skew detection and correction in scanned document images through clustering of probabilistic hough transforms." Pattern recognition letters 152 (2021): 93-99 (Year: 2021).*

*Primary Examiner* — Henok Shiferaw
*Assistant Examiner* — Toluwani Mary-Jane Ijaseun
(74) *Attorney, Agent, or Firm* — Maschoff Brennan (57) ABSTRACT

An image correction method, applicable to an image to be corrected having two boundary, comprises: extending a first and a second straight line in the image to be corrected to generate a first and a second extended straight line with both of them intersecting the first and second boundary to generate multiple intersection points; performing an extrapolation process based on multiple intersection points, center points of the two boundaries, and a half side length to generate a first and a second extrapolation line, rotating the image to be corrected when the first and second extrapolation lines have different slope values to generate a preliminary corrected image; and performing a Keystone correction process when the first and second extrapolation lines have same slope values or when obtaining the preliminary corrected image to generate a corrected image.

8 Claims, 4 Drawing Sheets

(51) Int. Cl.
  *G06T 7/70* (2017.01)
  *G06V 10/74* (2022.01)

(56) References Cited

U.S. PATENT DOCUMENTS

| | | | | |
|---|---|---|---|---|
| 9,083,909 | B2* | 7/2015 | Xie | G06T 5/80 |
| 10,176,395 | B2* | 1/2019 | Abbas | G06V 30/1478 |
| 10,922,794 | B2* | 2/2021 | Wang | G06T 7/60 |
| 11,176,644 | B2* | 11/2021 | Qian | G06T 7/80 |
| 2019/0180415 | A1* | 6/2019 | Lee | G06V 10/44 |
| 2021/0097653 | A1* | 4/2021 | Xue | G06T 7/73 |
| 2022/0189064 | A1* | 6/2022 | Huang | G06T 7/80 |

\* cited by examiner

IMAGE CORRECTION SYSTEM AND METHOD

CROSS-REFERENCE TO RELATED APPLICATIONS

This non-provisional application claims priority under 35 U.S.C. § 119 (a) on Patent Application No(s). 111105064 filed in Republic of China (R.O.C) on Feb. 11, 2022, the entire contents of which are hereby incorporated by reference.

BACKGROUND

1. Technical Field

This disclosure relates to an image correction system and method, especially relates to an image correction system and method that can generate an image with viewpoint close to a horizontal viewpoint.

2. Related Art

Whether it is in an online-classrooms, video, factories, traffic sites or other environments, cameras are often set up to capture images in the site, and then the objects in the images are identified manually or by computer, to process corresponding actions based on a result of the identification. For example, when the camera is set up inside a factory, the image obtained by the camera is usually for tracking the position and/or the quality of the workpiece on a production line, so the mounting position of the camera is so important that the image obtained by the camera may present the actual condition of the workpiece more accurately. Or, when the camera is configured to capture images in the classroom to provide online teaching images, the photographer may have to manually adjust the mounting position of the camera often, to make the image more likely to have a face-to-face effect.

Generally, based on the consideration of the image capturing range and the space, cameras are usually mounted at a higher place. However, as long as the mounting position of the camera is too high or too low, images having viewpoints from a depression angle or an elevation angle may be generated, and the depression angle or the elevation angle may cause an error in a position and/or a quality of a workpiece presented in the image, or may cause a scale of people or objects in an online-classroom or video images to become abnormal. It is usually through manually correcting the image or manually adjusting the angle of the camera to reduce the error caused by the elevation viewpoints or depression viewpoints. However, whether it is to correct the image or adjust the camera, it is required to compare and correct back and forth, which not only causes the labor cost and time cost being too high, and the correction method is not accurate enough.

SUMMARY

Accordingly, this disclosure provides an image correction system and method to meet the needs that are mentioned above.

According to an embodiment of the present disclosure, an image correction method which is applicable to an image to be corrected, comprises: generating a first extrapolation line segment and a second extrapolation line segment correspondingly based on a first straight line segment and a second straight line segment in the image to be corrected; determining whether a slope value of the first extrapolation line segment and a slope value of the second extrapolation line segment are the same; when determining the slope value of the first extrapolation line segment and the slope value of the second extrapolation value are different, rotating the image to be corrected by a rotation angle to obtain a preliminary corrected image, wherein the slope value of the first extrapolation line segment and the slope value of the second extrapolation value are the same; and when determining the slope values of the first extrapolation line segment and the slope value of the second extrapolation value are the same or when obtaining the preliminary corrected image, performing a keystone correction process to generate a corrected image.

According to an embodiment of the present disclosure, an image correction system which is applicable to an image to be corrected, comprising: a camera configured to obtain the image to be corrected; and a processor configured to generate a first extrapolation line segment and a second extrapolation line segment correspondingly based on a first straight line segment and a second straight line segment in the image to be corrected. The processor also determines whether a slope value of the first extrapolation line segment and a slope value of the second extrapolation line segment are the same, and when the processor determines the slope values of the first extrapolation line segment and the second extrapolation line segment are different, the processor rotates the image to be corrected by a rotation angle to obtain a preliminary corrected image, wherein the first extrapolation line segment and the second extrapolation line segment of the preliminary corrected image have the same slope value, when the processor determines the first extrapolation line segment and the second extrapolation line segment have the same slope value or obtains the preliminary corrected image, the processor performs a keystone correction process to generate a corrected image.

In view of the above description, one or more embodiments of the image correction system and method according to the present disclosure may generate an image with viewpoint similar to a horizontal viewpoint, and may correct the image accurately to significantly lower the time cost and labor cost of correcting the image. Additionally, according to one or more embodiments of the image correction system and method of the present disclosure, when the image to be corrected is an image of an online classroom or video image, a person in the corrected image may seem like facing to the camera (which is similar to a horizontal viewpoint), to achieve an effect similar to being face to face with the person in the image.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The image correction method and system of the present disclosure mainly generates at least two extrapolation line segments correspondingly based on the at least two straight line segments in an image to be corrected, to correct the image to be corrected based on the at least two extrapolation line segments.

Figure 1:
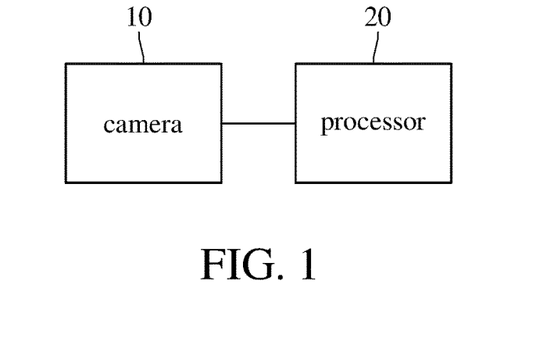
FIG. 1 is a block diagram illustrating an image correction system according to an embodiment of the present disclosure.

Further, please refer to FIG. 1, which is a block diagram illustrating an image correction system according to an embodiment of the present disclosure. The image correction system of the present disclosure preferably includes a camera 10 and a processor 20, wherein the camera 10 may be electrically connected to the processor 20, or also may be connected to the processor 20 through the internet, and the present disclosure does not limit the signal connection relationship between the camera 10 and the processor 20. The camera 10 is configured to obtain an image to be corrected, and the processor 20 is configured to process image correction on the image to be corrected and output a corrected image. The processor 20 may output the corrected image to a display for the display to display the corrected image, but the present disclosure is not limited to thereof.

Figure 2:
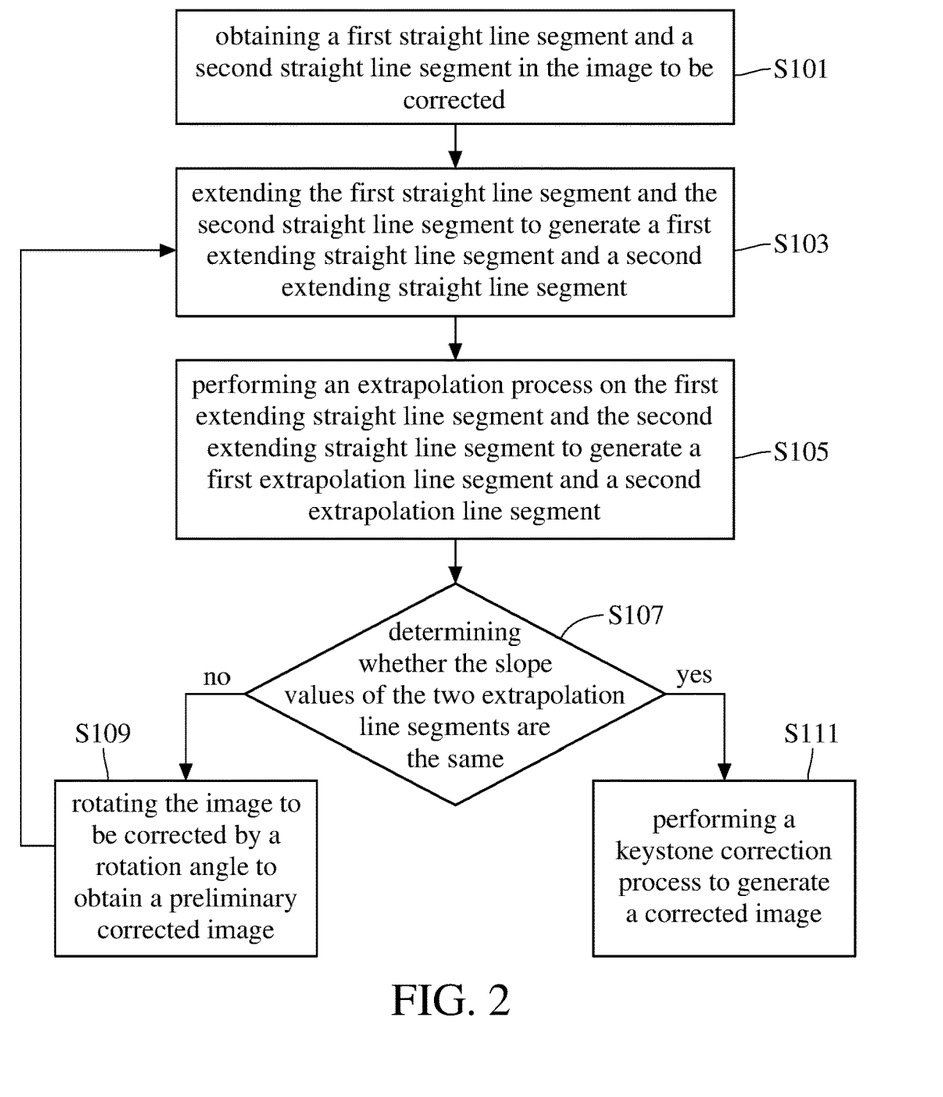
FIG. 2 is a flow chart illustrating an image correction method according to an embodiment of the present disclosure.

Please refer to FIG. 1 and FIG. 2, wherein FIG. 2 is a flow chart illustrating an image correction method according to an embodiment of the present disclosure. In order to make the present disclosure easier to understand, the following image correction method may be described with reference to FIGS. 3A~3E, wherein the implementation of generating at least two extrapolation line segments based on at least two straight line segments in the image to be corrected mentioned above may be as steps S101, S103, and S105 hereinafter.

Step S101: obtaining a first straight line segment and a second straight line segment in an image to be corrected.

Figure 3A:
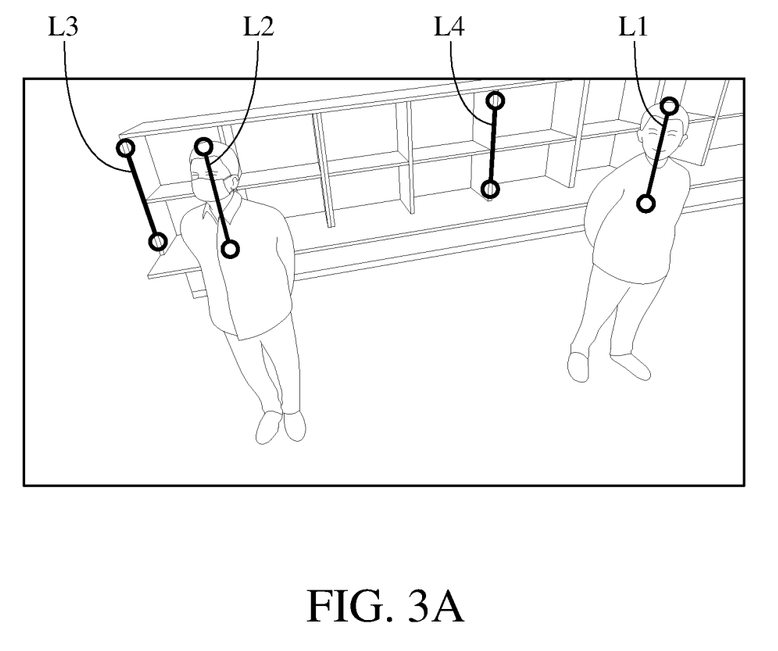
FIGS. 3A~3E are schematic diagrams illustrating an image correction according to an embodiment of the present disclosure.

FIG. 3A is a schematic diagram illustrating an image correction according to an embodiment of the present disclosure. As shown in the figure, the processor 20 may first detect objects in the image to be corrected received from the camera 10, the objects may be, such as human figure, shelf, or televisions, etc., to obtain multiple straight line segments L1~L4 associated with the objects and regard the straight line segments L1~L4 as the n straight line segments.

The processor 20 processes step S101 by, for example, the software "OpenVINO" to detect first, and using computer vision techniques to capture edges and backbones of the objects to obtain the straight line segments L1~L4, and the straight line segments L1~L4 are substantially perpendicular to the ground in the image capturing scene of the image to be corrected. That is, when the object is a human figure, the processor 20 regards a connection of the head part and the center of the body of the human figure as the straight line segment; when the object is shelf or other objects, the processor 20 regards the edges of the shelf as the straight line segments. In other words, as long as the object have edges or backbones that can be used as the straight line segments, the processor 20 may use computer visual techniques to obtain the straight line segments, and the present disclosure does not specifically limit the types of the object.

For easy understanding, in the following embodiments, only the straight line segments L1 and L2 in FIG. 3A are described as the first straight line segment and the second straight line segment.

Step S103: extending the first straight line segment and the second straight line segment to generate a first extending straight line segment and a second straight line segment.

Figure 3B:
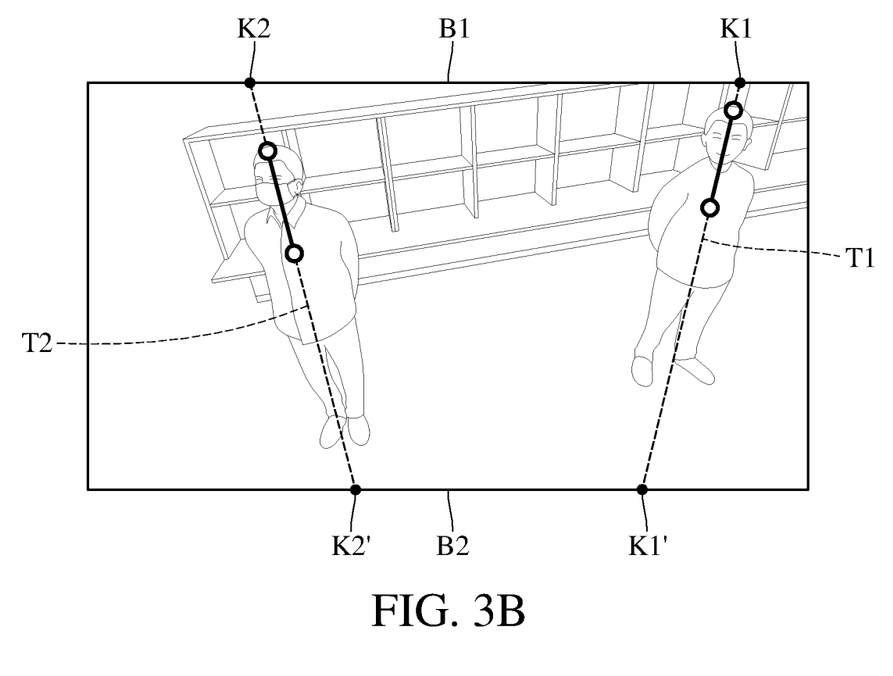

FIG. 3B is a schematic diagram illustrating the first extending straight line segment and the second straight line segment. As shown in FIG. 3B, the first extending straight line segment T1 and the second extending straight line segment T2 may be obtained by extending the first straight line segment and the second straight line segment, wherein both the first extending straight line segment T1 and the second extending straight line segment T2 intersect the first boundary B1 and the second boundary B2 to generate intersection points, that is, the first extending straight line T1 intersects the first boundary B1 at the intersection point K1 and intersects the second boundary B2 at the intersection point K1'; and the second extending straight line segment T2 intersects the first boundary B1 at the intersection point K2, and intersects the second boundary B2 at the intersection point K2'. It should be noted that the first boundary B1 and the second boundary B2 are preferably opposite and parallel to each other.

Step S105: performing an extrapolation process on the first extending straight line segment and the second extending straight line segment to generate a first extrapolation line segment and a second extrapolation line segment.

Figure 3C:
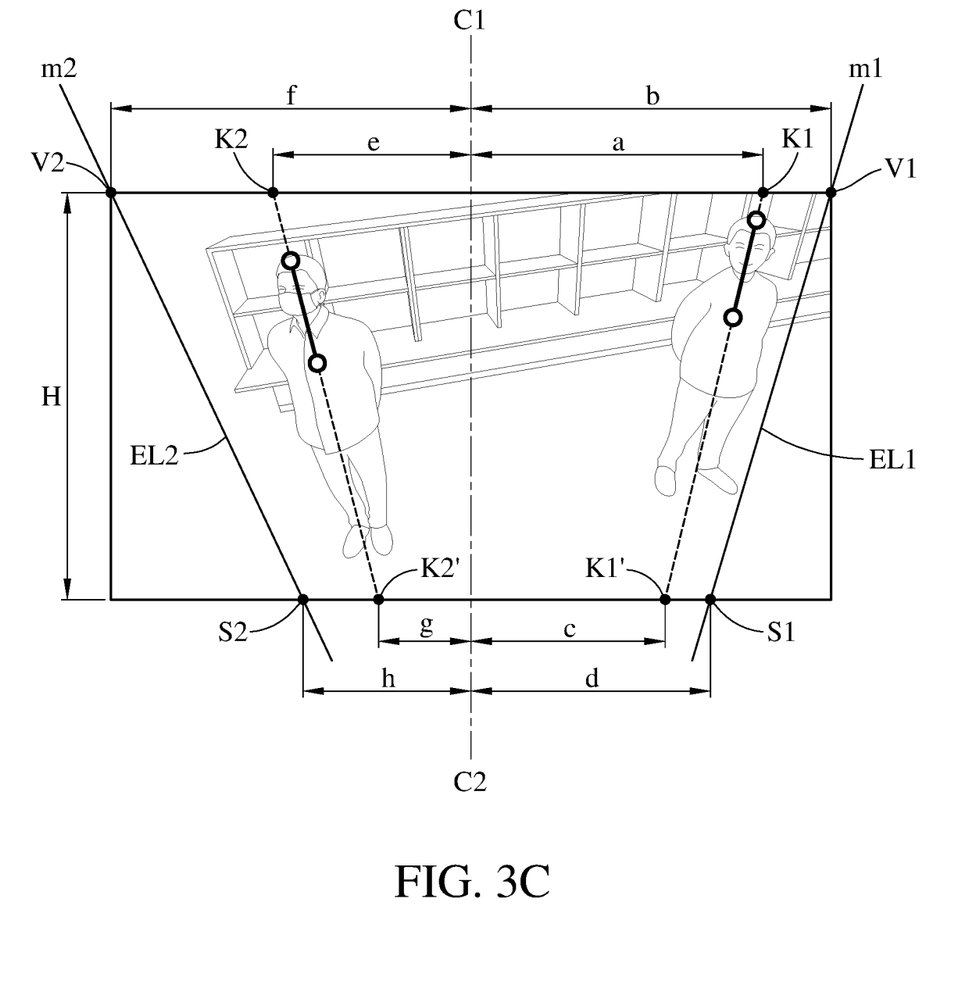

The processor 20 may perform an extrapolation process on the first extending straight line segment T1 and the second extending straight line segment T2 as shown in FIG. 3B, to generate the first extrapolation line segment EL1 and the second extrapolation line segment EL2 corresponding to the two extending straight line segments T1 and T2 as shown in FIG. 3C.

The processor 20 performs the extrapolation process based on several intersection points (K1, K1', K2, K2') where the first extending straight line segment T1 and the second extending straight line segment T2 intersect on the first boundary B1 and the second boundary B2, a center point C1 of the first boundary B1, a second center point C2 of the second boundary B2, and a half side length of the first boundary B1. The connection of the first center point C1 and the second center point C2 may preferably be perpendicular to the first boundary B1 and the second boundary B2, and the half side length of the first boundary B1 is a length b between the first center point C1 and an end point V1 of the first boundary B1 or a length f between the first center point C1 and an end point V2, that is, the center point of the two end points V1 and V2 is the first center point C1.

It should be noted that, in order for the processor 20 to obtain the lengths "b" and "f" directly instead of requiring the user to input the value of the lengths "b" and "f", the value of the lengths "b" and "f" are preferably obtained based on the first center point C1, wherein in the present embodiment length "b" may be preferably equal to length "f". However, the value of the lengths "b" and "f" may be obtained based on other points on the first boundary B1, and the present disclosure is not limited to thereof.

Additionally, a length between the first extending straight line segment T1 and the first center point C1 is "a", and a length between the first extending straight line segment T1 and the second center point C2 is "c"; similarly, the length between the second extending straight line segment T2 and the first center point C1 is "e", and the length between the second extending straight line segment T2 and the second center point C2 is "g".

Firstly, the first extended straight line segment T1 in FIG. 3B is used to illustrate that the processor 20 may calculate a length "d" by an extrapolation process based on the lengths "a", "b", and "c" through the following formula (1), wherein the length "d" is a length between the second center point C2 and the intersection point of the first extrapolation line segment EL1 and the second boundary B2.

$$a:b=c:d \qquad \text{formula (1)}$$

Therefore, after obtaining the length "d", the processor 20 may obtain the first extrapolation line segment EL1 according to the length "d". In other words, the first extrapolation line segment EL1 intersects the first boundary B1 at the end point V1 and intersects the second boundary B2 at intersection point S1, wherein the length between the intersection point S1 and the second center point C2 is the length "d".

Similarly, the processor 20 uses the same way as obtaining the first extrapolation line segment EL1 to calculate the length "h" based on the lengths "e", "f" and "g" to obtain the second extrapolation line segment EL2. Therefore, the way to obtain the second extrapolation line segment EL2 may not be repeated herein.

Since the slope value of the object is larger when the position of the object in the image to be corrected is closer to the center of the image to be corrected, the slope value of the extrapolation line segment may be obtained more accurately through the extrapolation process in the next step.

Step S107: determining if the slope values of the two extrapolation line segments are the same.

Firstly, the first extrapolation line segment EL1 in FIG. 3C is used to illustrate that the processor 20 may calculate the slope value m1 of the first extrapolation line segment EL1 based on the lengths "b", "d", and the distance H between the first boundary B1 and the second boundary B2 through the formula (2) as shown below.

$$m_n = \frac{H}{\left(b - \frac{b \times c}{a}\right)} \qquad \text{formula (2)}$$

Similarly, the processor 20 uses the same way as calculating the slope value $m_1$ of the first extrapolation line segment EL1 to the calculate the slope value $m_2$ of the second extrapolation line segment EL2. Therefore, the process of calculating the slope value $m_2$ of the second extrapolation line segment EL2 may not be repeated here.

After obtaining the slope value m1 of the first extrapolation line segment EL1 and the slope value m2 of the second extrapolation line segment EL2, the processor 20 may compare the two slope values m1 and m2 to determine whether the slope value of the first extrapolation line segment EL1 and the slope value of the second extrapolation line segment EL2 are the same. It should be noted that the processor 20 determining whether the two slope values are the same is only based on the value of $m_1$ and $m_2$, without taking the signs of $m_1$ and $m_2$ into account. Therefore, the processor 20 may compare the two slope values m1 and m2 through their absolute value or square value, etc. The present disclosure does not limit the way of comparing the two slope values $m_1$ and $m_2$.

When the processor determines that the slope values (slope values $m_1$ and $m_2$) of the first extrapolation line segment EL1 and the second extrapolation line segment EL2 are different in step S107, it continues to perform step S109: rotating the image to be corrected by the rotation angle to obtain the preliminary corrected image, wherein the first extrapolation line segment EL1 and the second extrapolation line segment EL2 in the preliminary corrected image have the same slope value.

Figure 3D:
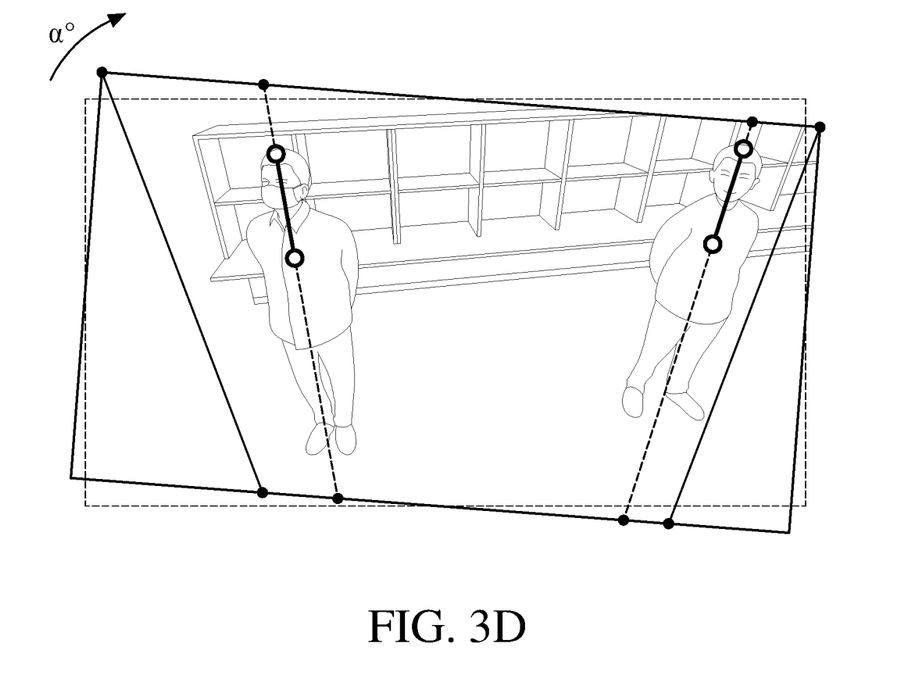

Referring FIG. 3D for illustration, for example, the processor 20 may determine the rotation angle of the image to be corrected according to the slope value of the first extrapolation line segment EL1 and the second extrapolation line segment EL2. The processor 20 obtains an intersection point where the first extrapolation line segment EL1 and the second extrapolation line segment EL2 intersect each other according to the slope values of the first extrapolation line segment EL1 and the second extrapolation line segment EL2, and calculates the required rotation angle based on an offset of the intersection point relative to the center line of the image (i.e. the line connecting the first center point C1 and the second center point C2) to rotate the image to be corrected by the rotation angle to obtain the preliminary corrected image, wherein the first extrapolation line segment EL1 and the second extrapolation line segment EL2 in the preliminary corrected image have the same slope value. In other embodiments, the processor 20 rotates the image step by step by a fixed range rotation angle α. For example, after the processor 20 rotates the image to be corrected by the rotation angel α (for example, 5 degrees), the processor 20 may obtain the preliminary corrected image by sequentially performing step S103, step S105, and step S107, wherein the first extrapolation line segment EL1 and the second extrapolation line segment EL2 in the preliminary corrected image have the same slope value. No matter how the processor 20 rotates the image to be corrected, the first extrapolation line segment EL1 and the second extrapolation line segment EL2 in the preliminary corrected image obtained after the rotation may have the same slope value.

When step S107 determines the slope value of the first extrapolation line segment EL1 and the slope value of the second extrapolation line segment are the same, it continues to perform step S111: performing a keystone correction process to generate a corrected image.

When the processor 20 in step S107 determines that the two slope value $m_1$ and $m_2$ are the same, which means that the image to be corrected does not need to be rotate (for example, the image does not need to be rotated because of the set angle of the camera 10, or because the image to be corrected has been rotated to obtain the preliminary corrected image), so the processor 20 may perform the keystone correction process on the image to be corrected to obtain the corrected image. Moreover, the processor 20 may perform the keystone correction process on the image to be corrected according to the two slope values $m_1$ and $m_2$, that is, since the correction intensity of the keystone correction process is inversely proportional to the slope value, the processor 20 may refer to the two slope values $m_1$ and $m_2$ to perform the keystone correction process to generate the corrected image more efficiently.

Therefore, the length between the intersection point of the first extrapolation line segment EL1 and the second extrapolation line segment EL2 and the first center point C1 may be the same as the length between the intersection point of the first extrapolation line segment EL1 and the second boundary B2 and the second center point C2; similarly, the length between the intersection point of the second extrapolation line segment EL2 and the first boundary and the first center point C1 may be the same as the length between the intersection point of the second extrapolation line segment EL2 and the second boundary B2 and the second center point C2.

In other words, take the first extrapolation line segment EL1 as example, the length between the intersection point V1 of the first extrapolation line segment EL1 and the first boundary B1 and the first center point C1 may be the same as the length between the intersection point S1 of the first extrapolation line segment EL1 and the second boundary B2 and the second center point C2 (That is, the length "b" may be the same as the length "d" shown in FIG. 3C) in the corrected image. Similarly, the length between the intersection point V2 of the second extrapolation line segment EL2 and the first boundary B1 and the center point C1 in the corrected image is the same as the length between the intersection point S2 of the second extrapolation line segment EL2 and the second boundary B2 and the center point C2 in the corrected image (That is, the length "f" may be the same as the length "h" in FIG. 3C).

When the preliminary corrected image obtained in step S109 is performed through step S103, step S105, and is determined that the two extending straight line segments have the same slope value in step S107, the processor 20 may also perform the keystone correction process on the preliminary corrected image to generate the corrected image in step S111.

Figure 3E:
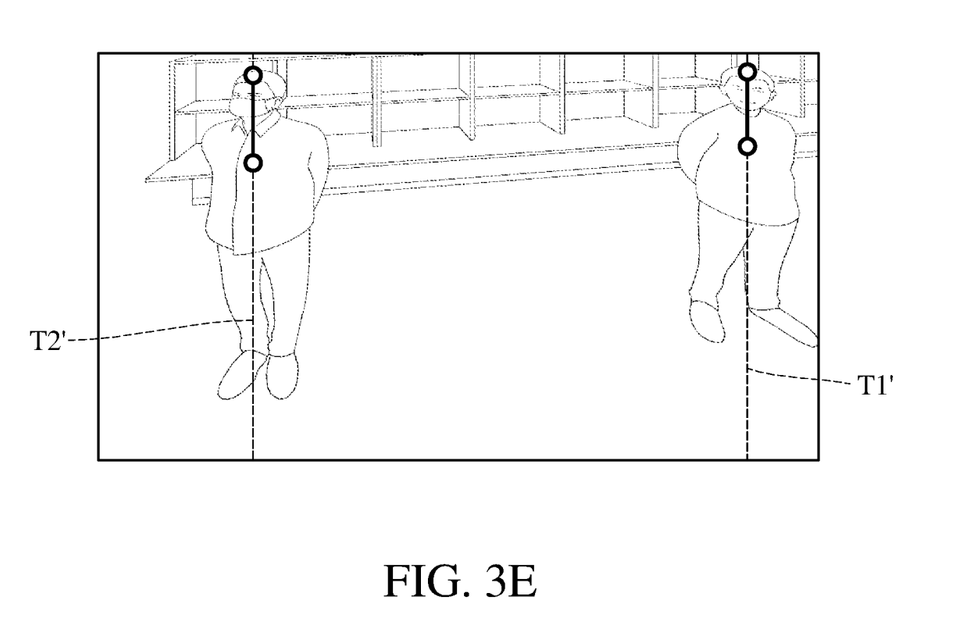

Accordingly, as shown in FIG. 3E, the corrected image generated by the processor 20 may be an image with viewpoint similar to a horizontal viewpoint, wherein the first extending straight line segment T1' and the second extending straight line segment T2' after correction are both preferably perpendicular to or almost perpendicular to the first boundary B1 and the second boundary B2.

Additionally, the camera 10 may periodically obtain the image to be corrected for the processor 20 to periodically detect the objects in the image to be corrected. Therefore, after the processor 20 generates the corrected image, the processor 20 may further obtain another image to be corrected and detect other objects in the another image to be corrected.

For the convenience of description, an initial image to be corrected used to generate the corrected image may be referred as a first image to be corrected, the objects in the first image to be corrected may be referred as first objects; the another image to be corrected obtained after the corrected image is generated may be referred as the second image to be corrected, and the another objects in the second image to be corrected may be referred as second objects, wherein at least a part of the second objects may be the same as at least a part of the first objects.

In other words, after generating the corrected image, the processor 20 may still detect the second objects in the second image to be corrected, and because at least a part of the first objects and the second objects are the same, the processor 20 may calculate a displacement of the first objects and second objects that are the same objects in the first objects and the second objects based on the first image to be corrected and the second image to be corrected, and process step S101 as shown in FIG. 2 when determining the displacement is greater than an acceptable displacement to obtain a third straight line segment of the second objects which have a displacement greater than the acceptable displacement, and update the first straight line segment and the second straight line segment with the third straight line segment to perform the steps afterwards, wherein a position of the second object in the second image to be corrected with the displacement greater than the acceptable displacement is different from the positions of the first objects in the first image to be corrected.

Take FIG. 3A as an example, if the human figure corresponding to the straight line segment L1 in the second image to be corrected afterwards is at another position in the image, and when the another position is different from a position of the human figure in the first image to be corrected, the processor 20 may determine whether the human figure has been displaced and whether the displacement is greater than the acceptable displacement. When the processor 20 determines that the displacement is greater than the acceptable displacement, then the processor 20 may perform step S101 to obtain the third straight line segment associated with the human figure in the second image to be corrected, and update the first straight line segment L1 with the third straight line segment.

In addition to determining whether to perform step S101 to obtain the third straight line segment in the second image to be corrected based on the displacement, the processor 20 may also perform step S101 to obtain the third straight line segment associated with the second object when detecting there is a second object that is different from the first objects in the second image to be corrected or when the computer is restarted.

In view of the above description, one or more embodiments of the image correction system and method according to the present disclosure may generate an image with viewpoint similar to a horizontal viewpoint, and may correct the image accurately to significantly lower the time cost and labor cost of correcting the image. Additionally, according to one or more embodiments of the image correction system and method of the present disclosure, when the image to be corrected is an image of an online classroom or video image, a person in the corrected image may seem like facing to the camera (which is similar to a horizontal viewpoint), to achieve an effect similar to being face to face with the person in the image.

What is claimed is:

1. An image correction method, which is applicable to an image to be corrected, comprising:
    generating, by a processor, a first extrapolation line segment and a second extrapolation line segment correspondingly based on a first straight line segment and a second straight line segment in the image to be corrected;
    determining, by the processor, whether a slope value of the first extrapolation line segment and a slope value of the second extrapolation line segment are the same;
    when determining the slope value of the first extrapolation line segment and the slope value of the second extrapolation line segment are different, rotating, by the processor, the image to be corrected by a rotation angle to obtain a preliminary corrected image, wherein the first extrapolation line segment and the second extrapolation line segment of the preliminary corrected image have the same slope value; and
    when determining the first extrapolation line segment and the second extrapolation line segment have the same slope value or obtaining the preliminary corrected image, performing, by the processor, a keystone correction process to generate a corrected image;
    wherein the image to be corrected has a first boundary and a second boundary that are opposite of and parallel with each other, and generating, by the processor, the first extrapolation line segment and the second extrapolation line segment comprises:
  extending the first straight line segment and the second straight line segment to generate a first extending straight line segment and a second extending straight line segment, wherein both the first extending straight line segment and the second extending straight line intersect the first boundary and the second boundary; and
  performing an extrapolation process to obtain the first extrapolation line segment and the second extrapolation line segment according to a plurality of intersection points of both the first extending straight line segment and the second extending straight line segment intersecting the first boundary and the second boundary, a first center point of the first boundary, a second center point of the second boundary and a half side length of the first boundary, wherein the half side length is a length between the first center point and an end of the first boundary, and the first extrapolation line segment and the second extrapolation line segment passes the end and another end of the first boundary, respectively.

2. The image correction method of claim 1, wherein rotating the image to be corrected by the rotation angle to obtain the preliminary corrected image comprises
  rotating the image to be corrected step by step with a fixed range so as to let the first extrapolation line segment and the second extrapolation line segment have the same slope value.

3. The image correction method of claim 1, wherein rotating the image to be corrected by the rotation angle to obtain the preliminary corrected image comprises:
  rotating the image to be corrected according to the slope value of the first extrapolation line segment and the slope value of the second extrapolation line segment so as to let the first extrapolation line segment and the second extrapolation line segment in the preliminary corrected image have the same slope value.

4. The image correction method of claim 1, wherein before extending the first straight line segment and the second straight line segment of the image to be corrected, the method further comprises: detecting a plurality of objects in the image to be corrected to obtain a plurality of straight line segments which are associated with the plurality of objects, and two straight line segments of the plurality of straight line segments are regarded as the first straight line segment and the second straight line segment, wherein the image to be corrected is a first image to be corrected, the plurality of objects are a plurality of first objects, and after generating the corrected image, the image correction method further comprises:
  detecting a plurality of second objects in a second image to be corrected, wherein at least a part of the plurality of second objects are the same as at least a part of the plurality of first objects;
  determining whether a displacement of one of the plurality of second objects in the second image to be corrected is greater than an acceptable displacement based on the first image to be corrected and the second image to be corrected; and
  when determining the displacement is greater than the acceptable displacement, obtaining a third straight line segment of the second object with the displacement greater than the acceptable displacement in the second image to be corrected, and using the third straight line segment to update the first straight line segment or the second straight line segment, wherein a position of the second object with the displacement greater than the acceptable displacement is different from a plurality of positions of the plurality of first objects in the first image to be corrected.

5. An image correction system, which is applicable to an image to be corrected, the image correction system comprising:
  a camera configured to obtain the image to be corrected; and
  a processor configured to generate a first extrapolation line segment and a second extrapolation line segment correspondingly based on a first straight line segment and a second straight line segment in the image to be corrected,
  wherein the processor also determines whether a slope value of the first extrapolation line segment and a slope value of the second extrapolation line segment are the same, and when the processor determines the slope value of the first extrapolation line segment and the slope value of the second extrapolation line segment are different, the processor rotates the image to be corrected by a rotation angle to obtain a preliminary corrected image, wherein the first extrapolation line segment and the second extrapolation line segment of the preliminary corrected image have the same slope value,
  wherein when the processor determines the first extrapolation line segment and the second extrapolation line segment have the same slope value or obtains the preliminary corrected image, the processor performs a keystone correction process to generate a corrected image;
  wherein the image to be corrected have a first boundary and a second boundary which are opposite of and parallel with each other, and the processor generating the first extrapolation line segment and the second extrapolation line segment comprises: the processor extending the first straight line segment and the second straight line segment to generate a first extending straight line segment and a second extending straight line segment, wherein both the first extending straight line segment and the second extending straight line segment intersect the first boundary and the second boundary, the processor also performs an extrapolation process to obtain the first extrapolation line segment and the second extrapolation line segment according to a plurality of intersection points of the first extending straight line segment intersecting the second extending straight line segment at the first boundary and the second boundary, a first center point of the first boundary, a second center point of the second boundary and a half side length of the first boundary, wherein the half side length is a length between the first center point and an end of the first boundary, and the first extrapolation line segment and the second extrapolation line segment passes the end and an another end of the first boundary, respectively.

6. The image correction system of claim 5, wherein the processor rotating the image to be corrected by the rotation angle to obtain the preliminary corrected image comprises: the processor rotating the image to be corrected step by step with a fixed range so as to let the first extrapolation line segment and the second extrapolation line segment in the preliminary corrected image have the same slope value.

7. The image correction system of claim 5, wherein the processor rotating the image to be corrected by the rotation angle to obtain the preliminary corrected image comprises: the processor rotating the image to be corrected by the rotation angle according to the slope value of the first extrapolation line segment and the slope value of the second extrapolation line segment to obtain the preliminary corrected image so as to let the first extrapolation line segment and the second extrapolation line segment in the preliminary corrected image have the same slope value.

8. The image correction system of claim 5, wherein before the processor extends the first straight line segment and the second straight line segment in the image to be corrected, the processor further detects a plurality of objects in the image to be corrected to obtain a plurality of straight line segments which are associated to the plurality of objects, and regards two straight line segments of the plurality of straight line segments as the first straight line segment and the second straight line segment, and the image to be corrected is a first image to be corrected, the plurality of objects are a plurality of first objects, and the processor further detects a plurality of second objects in a second image to be connected after generating the corrected image, wherein at least a part of the plurality of second objects and at least a part of the plurality of first objects are the same, and determines whether a displacement of one of the plurality of second objects in the second image to be corrected is greater than an acceptable displacement based on the first image to be corrected and the second image to be corrected, and when the processor determines the displacement is greater than the acceptable displacement, obtains a third straight line segment of the second object with the displacement greater than the acceptable displacement in the second image to be corrected, and updates the first straight line segment or the second straight line segment with the third straight line segment, wherein a position of the second object with the displacement greater than the acceptable displacement is different from a plurality of positions of the plurality of first objects in the first image to be corrected.

* * * * *